Jan. 26, 1960 A. G. CHYNOWETH 2,922,986

FERROELECTRIC MEMORY DEVICE

Filed April 24, 1956 3 Sheets-Sheet 1

INVENTOR
A. G. CHYNOWETH
BY H. O. Wright
ATTORNEY

INVENTOR
A. G. CHYNOWETH
BY
H. O. Wright
ATTORNEY

Jan. 26, 1960 A. G. CHYNOWETH 2,922,986

FERROELECTRIC MEMORY DEVICE

Filed April 24, 1956 3 Sheets-Sheet 3

INVENTOR
A. G. CHYNOWETH
BY H. O. Wright
ATTORNEY 2,922,986

FERROELECTRIC MEMORY DEVICE

Alan G. Chynoweth, New Providence, N.J., assignor to Bell Telephone Laboratories, Incorporated, New York, N.Y., a corporation of New York Application April 24, 1956, Serial No. 580,340

15 Claims. (Cl. 340—173)

This relates in general to the recording and reproduction of electrical signals; more particularly in systems utilizing ferroelectric crystalline material as the storage medium.

In recent years, the unique charge-storing properties of ferroelectric materials have been utilized for a wide variety of switching, computing, and signal recording-reproducing operations. For example, Patents 2,717,372 and 2,717,373, issued on September 6, 1955, to J. R. Anderson, disclose several arrangements for discrete pulse storage in ferroelectric media. Moreover, systems for recording continuously varying signals in ferroelectric media are disclosed by C. F. Pulvari in Patent 2,698,928, issued January 4, 1955, and in application Serial No. 479,208, filed jointly by W. P. Mason and R. N. Thurston on December 31, 1954, now Patent 2,775,650, issued December 25, 1956.

In each of the ferroelectric systems disclosed in the foregoing patents, storage takes place on the recording plane with a single degree of freedom; that is, the charge-storing function is represented at each instant by either the positive or negative saturation polarization on the hysteresis loop of the ferroelectric recording medium. Thus, if a substantially single domain crystal having a rectangular hysteresis characteristic is utilized for the storage medium, the charge-storage becomes simply a "positive-negative" function, whose amplitude is not smoothly related to the strength of the impressed signal. Such a condition is entirely adequate for many types of switching operations and digital computations. However, in order to amplitude-modulate the stored charge in accordance with the strength of the impressed signal, such as is required for the recording of continuously varying signals, the prior art systems disclosed by Pulvari and by Mason and Thurston, mentioned above, must necessarily utilize ferroelectric recording media in which the hysteresis characteristics slope gradually to saturation. Since, in these systems, signal storage takes place as a point-to-point variation in polarization in the direction of travel of a recording stylus along the medium, a high degree of uniformity in the hysteresis characteristic, coupled with the gradual slope to saturation, is desirable. This combination is sometimes difficult to attain.

It is accordingly the general object of the present invention to provide improvements in ferroelectric signal recording and reproducing systems.

More particular objects of the invention are to minimize signal distortion in such systems, and to provide greater latitude in the selection of recording media therefor.

A particular feature of the present invention is that it provides an extra degree of freedom in the storage of signals in ferroelectric media; that is, the magnitude of the signal that is read out of the medium is smoothly related to the magnitude of the signal that was previously impressed on the medium. This is achieved by sandwiching a layer of ferroelectric material between a high resistance electrode strip on one surface, and a low resistanec electrode strip or coating on the opposing surface. During the recording operation, the signal is applied at one end of the high resistance electrode, while the other end is grounded. If the recording medium is continuous, as in the case of a moving tape, the signal passes to ground in a direction transverse to the direction of travel of the recording stylus along the storage medium. The electrode on the opposing surface is grounded. Prior to recording, the ferroelectric layer is uniformly polarized in a given direction. The signal to be recorded is applied in the direction that tends to reverse the polarization by the setting up of a field in the medium between the two electrodes. This field in the medium is highest at the end of the high resistance electrode where the signal is applied, and decreases steadily toward the grounded end. Where the field is sufficiently strong the direction of polarization of the medium is reversed. Where the field is too weak, the direction of polarization is unaffected. Hence, at any instant, the algebraic sum of the polarization of the medium depends on the strength of the applied signal.

Such a system for recording on a ferroelectric medium, as disclosed in accordance with the present invention, has certain definite advantages over systems in which pulses or continuously varying signals are stored with only a single degree of freedom. For example, it does not depend for its operation on the hysteresis characteristic at a specific point on the recording medium. Moreover, it is not restricted to use of recording media having hysteresis characteristics of particular slope; and can in fact utilize recording media having rectangular hysteresis loops, inasmuch as the record, at any particular instant, is a lateral summation, rather than a point variation. This factor will permit modulation, in accordance with signal strength, of charge bits stored in pulse storage elements comprising single crystals having substantially rectangular hysteresis curves, such as disclosed by J. R. Anderson, supra. Moreover, in systems for storing continuously varying signals, the device of lateral summation taught by the present invention will permit greater latitude in the selection of the recording medium, since the variation of the recorded signal will be more nearly independent of the form and variation of the hysteresis characteristic in the medium.

By way of illustrative example, the present invention will be described in simplest form as applied to units comprising single crystals of barium titanate (or alternative ferroelectric material) characterized by a substatnially rectangular hysteresis loop. An alternative embodiment of the invention will be described in which the storage medium takes the form of a continuous tape comprising ferroelectric material.

For use in conjunction with recording arrangements of the type specified in the preceding paragraphs, which will be described in detail hereinafter, the invention contemplates several alternative types of systems for recovering the stored signal from the ferroelectric medium. One type of system utilizes pulses of exploratory voltage, such as disclosed by J. R. Anderson in Patents 2,717,372 and 2,717,373. Another type system, which may also be adapted to recover signals stored in accordance with the present invention, is disclosed in my pending application, Serial No. 501,413, filed April 14, 1955. The last-mentioned system utilizes an irradiating beam of energy that is absorbed by the storage element so as to stimulate a current flow by means of the pyroelectric effect, the magnitude of the current being a function of the stored signal. Still another type of system which may be alternatively employed for recovering signals stored in ferroelectric media, makes use of the semiconductor field effect, whereby the ferroelectric storage element is combined with a semiconductor element, the charge stored in the ferroelectric element serving to vary the conductivity of the semiconductor element in a manner disclosed, for example, in J. A. Morton application Serial No. 489,241, filed February 18, 1955.

Other objects, features and advantages of the present invention will be apparent from a study of the detailed description hereinafter, with reference to the attached drawings, in which.

Figure 8A:
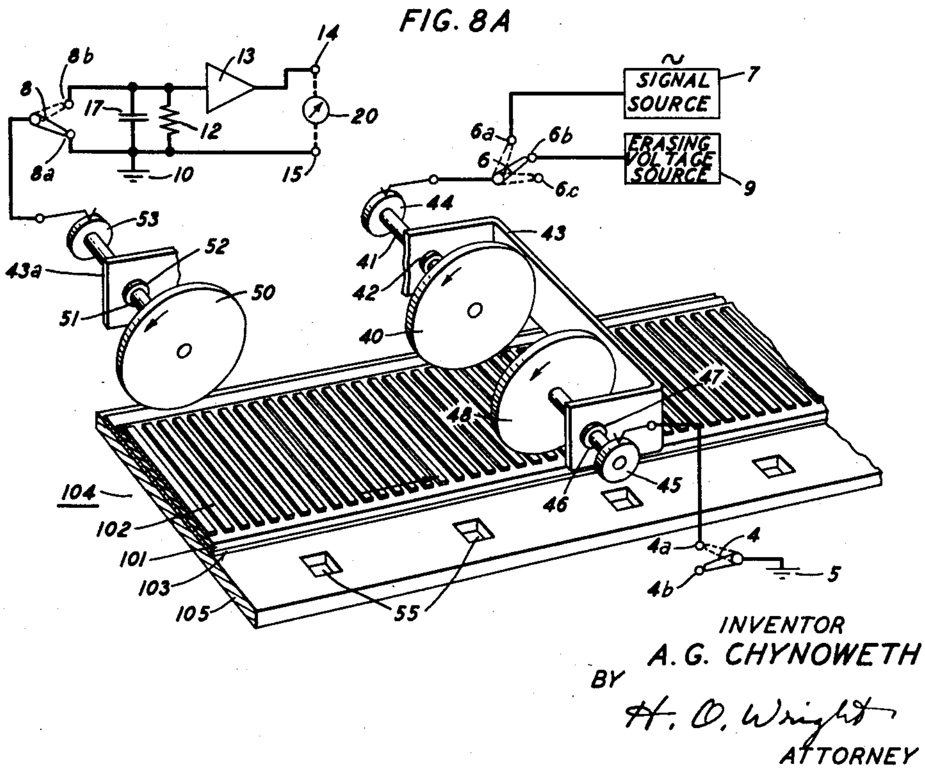
Figure 8B:
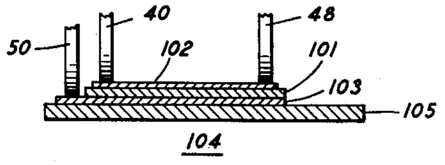
Figure 9:
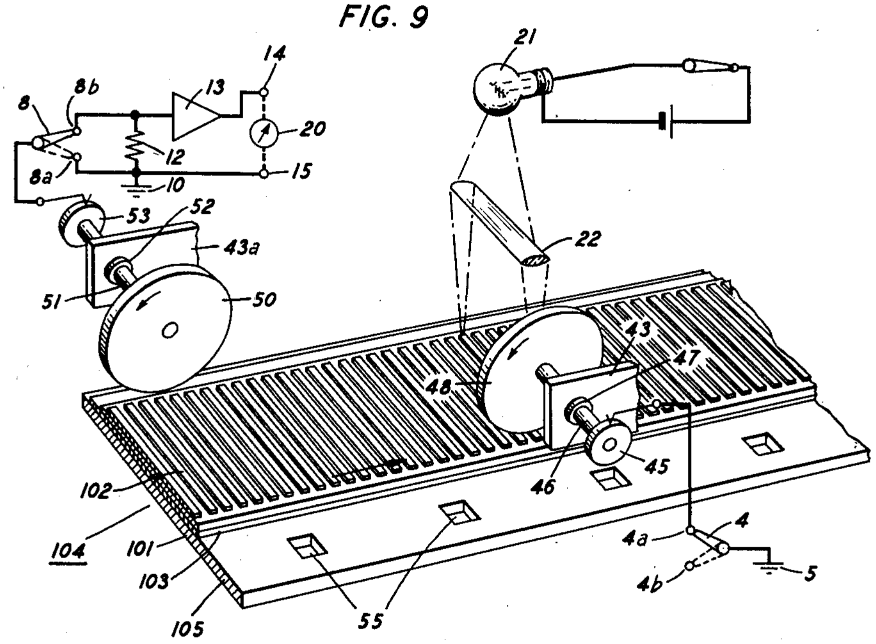
Figure 10:
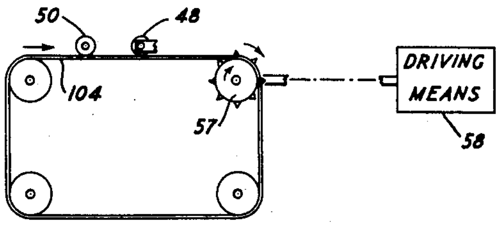

Figs. 8A and 8B disclose, in perspective and in end-elevation, respectively, a possible arrangement for recording and reproducing electrical signals on a moving ferroelectric tape in accordance with the present invention;

Fig. 9 shows in perspective a somewhat similar arrangement for recovering, by means of a pyroelectric beam focused on the tape, signals recorded on a moving ferroelectric tape in accordance with the present invention; and Fig. 10 indicates possible means for driving a ferroelectric tape with respect to the recording and reproducing mechanism indicated in Figs. 8A, 8B, and 9.

It is contemplated that any materials which are known in the art to exhibit ferroelectric characteristics, may be useful for the purposes of the present invention, such as, for example, barium titanate, potassium niobate, or guanidinium aluminum sulphate hexahydrate, and substances isomorphous therewith, which latter are disclosed in B. T. Matthias' application Serial No. 489,193, filed February 18, 1955.

By way of specific example, it will be assumed that the units disclosed in Figs. 1, 2, 5 and 6 of the drawings include, as the ferroelectric elements thereof, substantially single domain crystals of barium titanate which have been so prepared and processed that they exhibit hysteresis curves which are substantially rectangular in form. Suitable methods for preparing and processing such crystals are disclosed, for example, in J. P. Remeika's applications Serial No. 344,373, filed March 24, 1953, and Serial No. 476,745, filed December 21, 1954. For the purposes of the present invention, for example, a suitable single crystal element of barium titanate may be about one-half by one-quarter inch, and of the order of 5 mils thick, and so oriented that its "c" or optic axis is in the thickness direction.

Figure 1:
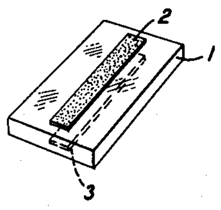
Fig. 1 is a perspective showing of a single crystal ferroelectric storage element in accordance with the present invention.

In accordance with a specific feature of the present invention, as indicated in Fig. 1 of the drawings, a highly resistive electrode strip is evaporated onto one of the major surfaces of a ferroelectric storage element of the type indicated in the foregoing paragraph. Referring to Fig. 1, the ferroelectric crystal 1 in the present illustrative embodiment is of the form described in the preceding paragraph. A strip 2 of carbon (or an alternative high resistance film) having length and width dimensions of, for example, 0.4 inch by 10 mils, is evaporated onto one of the major surfaces of the crystal 1, symmetrically placed and parallel with respect to each pair of edges thereof. Strip 2 is made thin enough to have a uniform resistance of greater than 1,000 ohms per square, and preferably at least 10,000 ohms per square. It will be apparent to those skilled in the art that a thin metallic strip, having a resistance per square such as described, may comprise, instead of carbon, metallic films such as platinum, aluminum, gold, titanium, silver, etc.

To the under surface of the ferroelectric crystal element 1, is evaporated a conventional low resistance electrode of, for example, platinum, having a resistance of about 100 ohms per square. In preferred form this assumes length and width dimensions which substantially correspond to those of the high resistance electrode on the upper surface of element 1.

Several simple methods of forming on the surfaces of ferroelectric single crystals precisely dimensioned electrode shapes or fine lines, such as the indicated shapes for electrodes 2 and 3, have been set forth in detail, as related to metal films, in J. Andrus' application Serial No. 537,455, filed September 29, 1955.

In order to condition a ferroelectric element, such as previously described, for the storage of pulses of differing amplitudes, it must first be subjected to a polarizing voltage, so that the ferroelectric domains of the element are uniformly oriented in the thickness direction.

For this purpose, a source of steady polarizing potential is connected across the electrodes 2 and 3 of a ferroelectric storage element of the type described in the foregoing paragraphs and illustrated in Fig. 1, the magnitude of the applied potential being appreciably greater than the coercive voltage of the element. In the case of the barium titanate signal crystal of the present illustrative embodiment, this would be about 2500 volts per inch of thickness.

Figure 2:
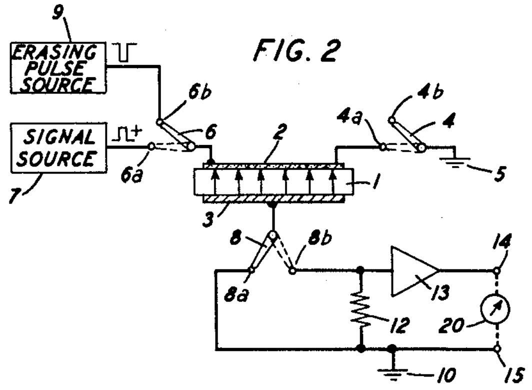
Fig. 2 is a schematic showing of an analog memory cell in accordance with the present invention, employing a ferroelectric element such as indicated in Fig. 1, which is adapted alternatively for preconditioning or erasing operations, for signal storage, and for recovery of the stored signal by application of exploratory pulses.

A suitable circuit for this purpose is indicated schematically in Fig. 2 of the drawings, wherein 1 represents a ferroelectric single crystal element comprising barium titanate or the like, such as previously described, having a thin, highly-resistive electrode strip 2 on one surface, and a highly conductive electrode coating 3, corresponding in shape to strip 2, on the opposite surface. At each of the ends of the highly-resistive coating 2, is an electrical connection to a multiple-pole switch. At one end, switch 4 makes or breaks contact to ground 5 in alternative positions **4*a* or 4*b* respectively. At the other end, switch 6, when in position 6*a*, makes contact between one end of strip 2 and a conventional source 7 of input signals; and when in position 6*b*, connects element 2 to a polarizing or erasing voltage source 9. The latter supplies a voltage pulse opposite in sign and substantially in excess of the maximum signal voltage supplied by signal source 7**.

The highly conducting layer 3 on the opposing surface of the ferroelectric element 1, is connected to the armature of a two-way switch 8, of which contact **8*a* is connected directly to ground 10; and contact 8*b* is connected through a 100,000 ohm resistor 12 to ground 10. The ungrounded terminal of the resistor 12 is connected in series with a conventional amplifier 13 to output terminal 14, which is paired with output terminal 15 returning to ground. A conventional type current meter 20, or alternatively, some other type of current measuring device, such as an oscilloscope, is connectable across terminals 14 and 15** to measure the current output of the unit.

In order to apply an initial uniform polarization to the ferroelectric element 1, switch 8 is connected in position **8*a* directly to ground 10; switch 4 is connected in position 4*b*, breaking contact with ground; and switch 6 is connected in position 6*b* to the pulse source 9, which supplies a negative erasing pulse of constant amplitude. After a short interval of, for example, $10^{-3}$ seconds, the crystal element 1** will be polarized uniformly through the thickness thereof in a direction indicated by the arrows.

Figure 3:
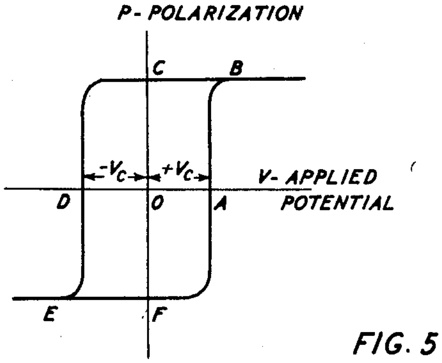
Fig. 3 is a hysteresis curve typical of the ferroelectric element of Figs. 1 and 2.

Fig. 3 shows a hysteresis loop ABCDEF, wherein applied voltage is plotted against resultant polarization, the curve shown being typical of barium titanate single crystals prepared in the manner described in J. P. Remeika's applications, Serial Nos. 344,373 and 476,745, supra. From Fig. 3, it is apparent that application of a negative potential substantially in excess of the coercive voltage $-V_c$ causes the domains of the element 1 to become initially negatively polarized to saturation at point E, finally assuming a uniform negative remanent polarization represented by the distance OF when the potential is removed. In crystal elements of the types disclosed by Remeika supra, this remanent polarization substantially approximates the negative polarization at saturation.

Figure 4:
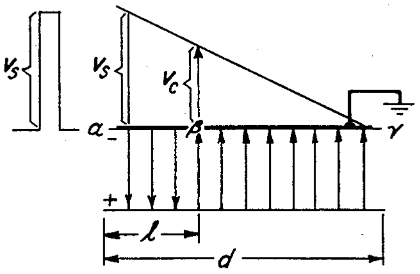
Fig. 4 is a diagram illustrating the theory of operation of the circuit of Fig. 2.

Assume, now, that it is desired to impress a signal on the element 1 for the purpose of producing therein a state of polarization which is a function of the amplitude of the applied signal voltage. For this recording operation, the circuit shown in Fig. 2 is rearranged as follows. The switch 4 is connected in position 4*a*, grounding, at one end, the high resistance electrode strip 2. The positive potential signal source 7 is connected in series to ground 5 through the high resistance electrode 2, by moving the switch 6 to position 6*a*. The switch 8 remains connected in position 8*a* to ground 10. In this condition, a positive pulse of signal voltage from the source 7 is impressed across the high resistance electrode 2 to ground 5, impressing a linear potential gradient along the surface of ferroelectric element 1, which reverses the initial polarization along a space interval in accordance with the signal strength, as indicated by the arrows in the diagram of Fig. 4. In order to be effective, the applied positive signal pulse must appreciably exceed the positive coercive voltage $+V_c$.

It will be apparent to those skilled in the art that the circuit will function equally well with the polarities of the erasing pulse source 9 and signal source 7 reversed, providing they oppose each other.

When the positive signal pulse is impressed across the high resistance electrode 2 to ground 5, the potential across the element 1 will decrease linearly to zero in the direction $\alpha\gamma$ and it is directed so that it tends to reverse the direction of the initial polarization in the element 1. This condition is illustrated graphically in Fig. 4. Assuming the pulse $V_s$ from source 7 is substantially greater than the coercive voltage $V_c$, the ferroelectric domains at the high potential end of element 1 will be reversed with respect to the *c* axis, or thickness direction. Referring to Fig. 3, the domains in that part across which the applied positive potential exceeds $V_c$ will, figuratively, traverse the portion FABC of the hysteresis loop, reaching an ultimate positive remanent polarization corresponding to OC after the positive signal is removed.

At some point $\beta$ along the high resistance electrode 2, the field will cease to be strong enough to reverse the polarization of the electrical domains. At this point, the impressed potential just equals the coercive voltage $V_c$. It is apparent from the diagram of Fig. 4, assuming a linear resistance of electrode 2, that:

$$\frac{V_s}{V_c}=\frac{d}{d-l} \qquad (1)$$

where $V_s$ equals the signal potential impressed at $\alpha$, $V_c$ equals the coercive voltage, *d* is the entire length of the resistive element 2 between contact points $\alpha$ and $\gamma$; and *l* is the portion $\alpha\beta$ along resistor 2 where the potential is greater than $V_c$. Hence, it is apparent from Equation 1 that over a selected range of values of $V_s$, the portion of the storage element 1 of which the polarization is not reversed, is a smooth inverse function of the impressed signal.

Let us now assume that it is desired to read-out or recover the signal which has been recorded in the medium 1. The circuit indicated in Fig. 2 is so arranged that the element 1, which now contains a stored record, is stimulated to produce an output current which is a smooth function of the stored record and, hence, of the input signal $V_s$. The read-out circuit arrangement to be described with reference to Fig. 2 utilizes an exploratory or erasing pulse from source 9, oppositely poled to the stored signal, in a manner described in detail, for example, in J. R. Anderson's application Serial No. 254,245, filed November 1, 1951.

For the read-out condition, switch 6 is placed on contact 6*b*, connecting negative pulse source 9 to electrode 2. Simultaneously, switch 4 is moved to position 4*b*, disconnecting ground 5. Switch 8 is moved to position 8*b*, thereby connecting highly conducting electrode 3 to the resistor 12, across which is derived the output signal.

It will be apparent that for the read-out function, the negative voltage pulse from source 9 must substantially exceed in absolute value the largest positive signal storage pulse from the source 7.

Referring again to Equation 1, it is seen that $(d-l)$ varies inversely as the input signal $V_s$, where *d* is the total length of high resistance electrode 2, and *l* is that portion of the length along which the domains have been reversed in polarity by the applied signal voltage. Referring again to Figs. 2 and 4, it will be apparent that the output current $i_o$, to be derived at output terminal 14 upon application of a negative exploratory pulse from source 9, is proportional to *l*, that part of the element 1 of which the polarity is reversed. From the foregoing Equation 1:

$$l=d\left(1-\frac{V_c}{V_s}\right) \qquad (2)$$

and $$i_o=Kd\left(1-\frac{V_c}{V_s}\right) \qquad (3)$$

where K is a constant.

When output current $i_o$ is plotted against impressed signal voltage $V_s$ in terms of Equation 3, a hyperbola results in which the value of $i_o$ over the valid range $V_s>V_c$ increases smoothly with $1/V_s$. This relationship forms the basis on which the output meter 20 can be calibrated to read in terms of the input function, i.e., the amplitude of the stored signal.

Figure 5:
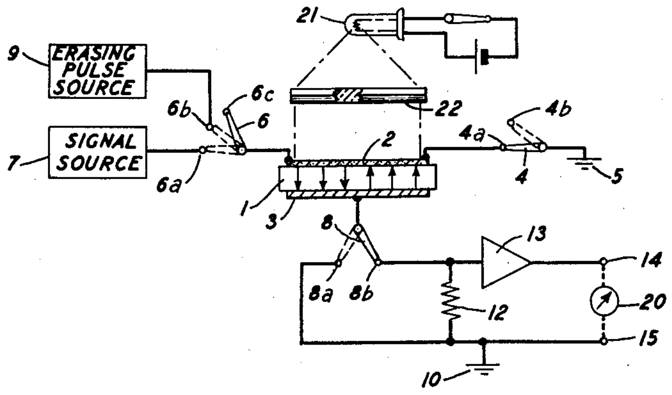
Fig. 5 is a schematic showing of a modified ferroelectric storage cell in accordance with the present invention, in which the storage element is arranged for recovery of the stored signal by means of the pyroelectric effect.

Another alternative device for recovering the stored record from the ferroelectric medium is indicated in Fig. 5 of the drawings. This is a modified form of the unit disclosed in Fig. 2. In the embodiment under discussion, a beam of light or infrared radiation is focused on a ferroelectric element which has been remanently polarized in accordance with an impressed signal voltage. This generates a pyroelectric current in the ferroelectric element which varies in sign and intensity in accordance with the net remanent polarization. Such an arrangement has the advantage of providing for read-out of the stored record without destroying or neutralizing it, as contrasted with the case described with reference to Fig. 2.

Referring in detail to Fig. 5, element 1, as in Figs. 1 and 2, represents a ferroelectric recording medium on one surface of which is imposed a highly-resistive electrode film 2, and on the opposing surface of which is imposed a highly conductive electrode film 3. For recording and erasing the stored signal, the operation of the circuit is conceived to be substantially similar to that described with reference to Fig. 2. For read-out, a source 21 of light, or other radiation, having a high infrared component is disposed in relation to a cylindrical lens system 22 so as to focus a line beam on the surface of the ferroelectric element 1 which substantially coincides in length and width with the high resistance strip 2. During this operation it is assumed that the signal source 7 and erasing pulse source 9 are disconnected, switch 6 being positioned on open contact 6*c*; and that ground 5 is connected to strip 2, switch 4 being positioned on contact 4*a*. As in the circuit previously described with reference to Fig. 2, the highly conductive electrode 3 is connected to a double pole switch 8 which, in position 8*a*, is directly connected to ground 10 for signal storage and erasing, and in position 8*b* is connected to the output circuit for read-out. The pole 8*b* is connected to one terminal of the resistive circuit 12, the other terminal of which is grounded. Pole 8*b* is also connected in series through conventional amplifier 13 to output terminal 14, which is paired to grounded terminal 15. As previously described, an output measuring device 20 is connected across terminals 14 and 15.

It is apparent that the portion, $l$, of element 1 whose polarization is reversed by the signal from signal source 7 is again given, from Equation 2, by the quantity $$d\left(1-\frac{V_c}{V_s}\right)$$

while the portion of element 1 whose polarization is not reversed is given by $(d-l)$; that is, the quantity $$d\frac{V_c}{V_s}$$

The instantaneous output current $i_o'$ arising from a pyroelectric current from element 1 will be given by the algebraic sum of the currents from the regions polarized in opposite directions. Hence:

$$i_o' \propto d\left(1-\frac{V_c}{V_s}\right)-d\frac{V_c}{V_s} \quad (4)$$

$$i_o'=K'd\left[1-2\frac{V_c}{V_s}\right] \quad (5)$$

where K' is a constant.

Again, the read-out signal $i_o'$ varies hyperbolically with the stored signal $V_s$, thus providing a smooth, continuous variation for calibration purposes, over the desired range $V_c<V_s$.

Figure 6:
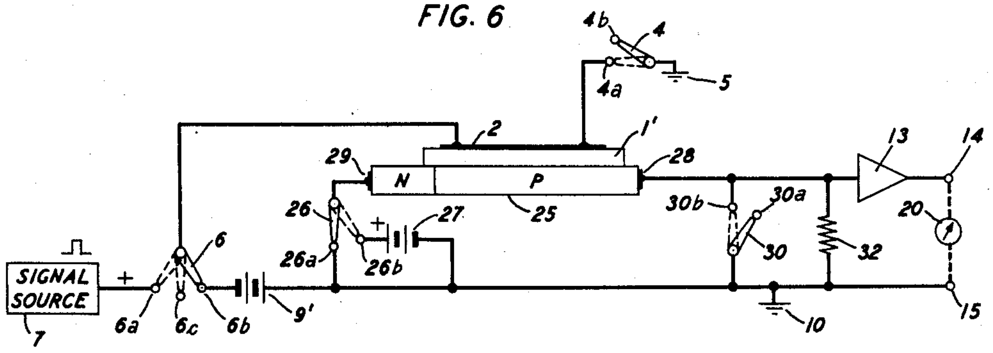
Fig. 6 is a schematic showing of another modification of the present invention which utilizes variations imposed by a ferroelectric storage element on the field of a semiconductor body to detect the signal stored in the former.

A distinctly different type of nondestructive read-out circuit is indicated in Fig. 6 of the drawings. This circuit combines the ferroelectric recording element with a semiconductor body in such a manner that the remanent polarization in the ferroelectric recording element imposes a field in the semiconductor element, thus controlling its conductivity.

Referring to Fig. 6 of the drawings, in the specific illustrative embodiment under description, the ferroelectric element 1' may be assumed to comprise a thin single crystal wafer of barium titanate or of a material known as guanidinium aluminum sulphate hexahydrate (or an isomorph thereof), such as disclosed in B. T. Matthias' application Serial No. 489,193, filed February 18, 1955. The ferroelectric element 1' has on one surface a highly-resistive outer electrode strip 2, such as previously described. The opposing surface is disposed in close contact with a semiconductor element 25 of, for example, germanium.

In the present illustrative embodiment, the element 25 may comprise a single crystal, for example, 0.5 mil thick, predominantly of p-type germanium having a grown-in layer of n-type near one of its ends, forming with the p-type a junction normal to the major surfaces of the crystal. Such a junction is formed by pulling a seed from a melt of adjusted composition, in a manner described, for example, in G. K. Teal's Patent 2,727,840, issued December 20, 1955. In a typical unit of the type described, the bulk resistivity of the p-zone is 0.1 ohm-centimeters, and that of the n-zone, 3.1 ohm-centimeters. It will be apparent that such a system would be operative with the p-type and n-type semiconductor zones in reverse relation, assuming, of course, that the biasing voltages to be described hereinafter are also reversed.

A ferroelectric wafer 1' of the type previously described and, for example, about 2 mils thick, is mounted on one of the major surfaces of the germanium crystal wafer 25, normal to the p-n junction thereof. Such an arrangement is described in detail in application Serial No. 489,241, filed by J. A. Morton, February 18, 1955. In the embodiment under description, the ferroelectric wafer 1' is substantially coextensive with the p-layer, and slightly overlapping the junction so as to abut the n-portion at one end.

A pure gold contact 28 makes low resistance contact with the p-zone at one end of element 25; whereas an electrode 29 which is essentially gold, containing about 1% of antimony, makes low resistance contact with the n-zone at the other end.

As in the devices previously described, the highly-resistant electrode 2 on the ferroelectric body 1' has two contacts spaced apart on the surface thereof. One of these contacts leads to a switch 4, having a closed position 4*a* and an open position 4*b*, respectively connecting and disconnecting ground 5. The other contact on the surface of electrode 2 leads to a second switch 6, of which pole 6*a* is connected to a source of positive storage pulses 7, pole 6*b* is connected to a source of negative polarizing or erasing voltage 9', and pole 6*c* is positioned for disconnection.

For optimum operation of the system, the erasing potential derived from source 9' should be of the order of 10 volts. The storage pulses, to be effective, should be of the same magnitude, also.

From the semiconductor body 25, contact 29 to the n-zone leads to the armature of switch 26, terminal 26*a* of which is connected to ground, and terminal 26*b* of which is connected to a positive direct current source 27 of, for example, 20 volts.

Contact 28 to the p-type zone is connected through output resistance 32, of, for example, 100,000 ohms, to ground 10. A switch 30, having open and closed positions 30*a* and 30*b*, respectively, is connected to enable output resistance 32 to be short-circuited. The junction of resistor 32 and electrode 28 is connected through the conventional amplifying circuit 13 to output terminal 14, the correlated output terminal 15 being returned to ground. As in the previously described circuits, a current measuring device 20, which may comprise simply a calibrated current meter, or alternatively, an oscilloscope, is connected across terminals 14 and 15.

The operation of the above-described circuit for polarizing, storage, and recovery of the stored signal, respectively, will now be described in detail.

Figure 7:
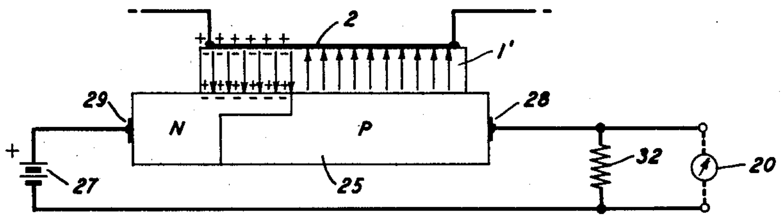
Fig. 7 is a diagram illustrating the theory of operation of the circuit of Fig. 6 of the drawings.

For polarizing, or erasing the polarization pattern on the element 1', the switch 4 is positioned on open contact 4*b*, thereby disconnecting ground 5 from the high resistance electrode 2. The switch 6 is moved to position 6*b*, connecting the negative pole of the battery 9' to the high resistance electrode 2; switch 26 is connected in position 26*a*, and switch 30 is connected in closed position 30*b*, thereby grounding the semiconducting body 25. Under this condition, a steady potential is applied through the thickness of the ferroelectric layer 1', thereby causing the domains of the said layer to be uniformly oriented in the thickness direction, as indicated by the direction of the arrows on the right-hand portion of 1', as shown in Fig. 7.

Subsequent to uniform polarization of the element 1', the circuit of Fig. 6 is arranged as follows for storage of an impressed signal. The switch 4 is moved to position 4*a*, thereby connecting the ground 5 to the highly-resistive electrode 2. Simultaneously the switch 6 is moved to position 6*a*, thereby connecting the positively poled signal source 7 in series relation to the high resistance electrode 2. During this operation, the switch 26 remains in position 26*a*, and switch 30 remains in position 30*b*, whereby the semiconductor body 25 is maintained at ground potential.

As in the devices previously described, the potential impressed across the high resistance layer 2 from the signal source 7 sets up a field in the element 1' which tends to reverse the direction of polarization of the ferroelectric element 1' to an extent which depends on the strength of the impressed signal.

For recovery of the stored signal, the switch 4 is moved to position 4b, disconnecting ground 5 from the high resistance electrode 2 on the surface of the ferroelectric element 1'. The switch 6 is positioned on contact 6c, thereby disconnecting the high resistance electrode 2 from the signal source 7. Simultaneously, switch 30 is opened to position 30a, and the switch 26 is placed in position 26b, whereby a positive voltage is applied from the battery 27 to the n-layer of the semiconducting body 25, thereby biasing the junction in the reverse, or high impedance, direction.

Referring to Fig. 7 of the drawings, it is seen that the positively charged portion of the ferroelectric element 1', corresponding to the stored pattern, induces a negative charge in the semiconductor body 25 producing an n-type channel in the p-zone, thereby increasing the area of the p-n junction, and the reverse saturation current through the junction. Clearly, the back-biased impedance of semiconductor 25 will vary smoothly with the extent of the n-type channel, which in turn is a function of the polarization boundary in the ferroelectric element 1', and hence, of the stored signal.

As mentioned before, a particular advantage of a read-out technique of the type described in the foregoing paragraph is that the stored signal remains intact irrespective of the number of times the read-out process is repeated.

Although Fig. 6 of the drawings shows a particular circuit arrangement for utilizing the semiconductor field effect for recovery of a signal stored in accordance with the present invention, it will be apparent to those skilled in the art that there are numerous other circuit configurations for carrying out this general method. In addition to the circuit disclosed in J. A. Morton's application Serial No. 489,241, mentioned hereinbefore with reference to the embodiment previously described, suitable circuit arrangements for this purpose are disclosed in the following patent applications filed February 18, 1955: W. L. Brown, application Serial No. 489,149; D. H. Looney, application Serial No. 489,141; and I. M. Ross, application Serial No. 489,223.

The circuits described with reference to Figs. 1, 2, 4 and 6 of the drawings have assumed the use of discrete storage bits. In accordance with a modification of the present invention, however, it is contemplated that a continuous ferroelectric recording layer 101, deposited on tape, may be substituted for the crystal element 1 of Fig. 1.

For use in combination with tape-recording and reproducing systems of the types to be described with reference to Figs. 8A, 8B and 9, hereinafter, the recording medium may take the form of a thin film of ferroelectric material sandwiched between a highly-conducting base layer on the underside, and a thin striated layer of highly-resistive material such as carbon, the outer surface of which will be in direct contact with a conducting stylus, or wheel, which moves over the surface. More specifically, the recording medium may comprise a film of barium titanate 101 about a half-micron thick, superposed on a substrate 103 of platinum or palladium, a few microns thick, which in turn is supported on a base layer of copper or some other conducting material to give the desired stiffness. Such a matrix may be prepared, for example, by evaporating barium titanate crystals at a temperature of about 1700 degrees centigrade in a vacuum onto the said substrate of platinum or palladium. The film of barium titanate so formed is subsequently heat treated in air at a temperature of between 500 and 600 degrees centigrade for an interval of approximately ten minutes. A further thin coating, 102 of carbon, having a resistance of about 1000 ohms per square, is then deposited on the surface of the barium titanate by evaporation, or any of the methods well known in the art. (As previously noted, a thin metallic coating can be substituted for carbon.) In preferred form, the coating 102 comprises a plurality of evenly spaced parallel lines or strips, each about a mil wide, and a mil apart, which extend substantially across the width of the tape. Although a continuous highly-resistant coating might be used, the separated highly-resistant strips will serve to reduce distortions caused by currents flowing along the tape. Highly-resistant lines or strips of the widths indicated above, can be delineated on the surface of the layer 101 in a manner such as disclosed, for example, in J. Andrus' application, Serial No. 537,455.

An alternative form of recording medium suitable for the purposes of the present invention may be produced by baking a ceramic layer comprising ferroelectric crystal material onto a conducting substrate. For example, the ceramic layer may take the form of a thin sheet produced in the manner described in Patent 2,582,993, issued to G. N. Howatt, January 22, 1952, having silver paste baked on one of the surfaces thereof. The sheet is then secured by soldering to a matrix surface of a desired shape. The ceramic layer is then ground down to the desired thickness of a few microns. As in the previous case, a high-resistance electrode layer 102 comprising a plurality of thin lines or strips of uniform high resistance, is deposited on the outer surface of the ferroelectric layer.

It will be readily apparent that for the purposes of the present invention, the recording medium may assume alternative forms suitable for continuous recording, such as, for example, a contacting layer on a rotatable drum, or disk, or any of the other forms used in recording and reproducing systems known in the art.

Although barium titanate has been mentioned by way of specific example, it will be apparent to those skilled in the art that other ferroelectric crystalline materials are also suitable for the purposes of this modification of the present invention. These include, for example, potassium niobate, or alternatively, guanidinium aluminum sulphate hexahydrate, or one of the ferroelectric materials isomorphous therewith which are disclosed in the application Serial No. 489,193 of B. T. Matthias, February 18, 1955.

In systems utilizing, for example, ferroelectric tape for storage or recovery of impressed signals, some mechanism is needed for moving the recording medium with respect to contacting members connected to the signal source, the polarizing source, or the output circuit.

An arrangement of a type suitable for moving the necessary contacts with respect to the tape is indicated in Figs. 8A and 8B of the drawings which show a section of the tape and the rotating mechanical contacts, in perspective, and in end-elevation, respectively.

Referring in detail to Fig. 8A, the recording medium 101 is a thin layer of ferroelectric material, superposed on one surface of which are thin parallel strips 102 of carbon or other highly-resistive material, and on the opposing surface of which is a highly-conductive layer 103, all as described in the foregoing paragraphs.

The electrical circuit arrangement is substantially the same as that described in detail above with reference to Fig. 2 of the drawings. A source 7 of continuously variable positive signal voltage, and a source 9 of constant negative erasing or polarizing voltage, of an absolute value greater than the maximum signal voltage, are respectively connected to contacts 6a and 6b of switch 6.

One end of each of the highly-resistive strips 102 on the ferroelectric medium 101 is contacted in succession by means of a metal wheel or disk 40 riding on the surface of the tape. The disk 40 is integrally mounted on an axle 41 which rides in an insulating bushing 42 mounted in a bearing in a supporting frame 43. Electrical contact between the armature of switch 6 and the axle 41 is made through rotatable contact 44 riding on the latter.

In a similar manner, the other end of each of the highly-resistive strips 102 is contacted in succession by means of the wheel or disk 48 riding on the surface of the tape. Wheel 48 is mounted on axle 46 which rides in an insulating bushing 47 in a bearing of the supporting frame 43. Rotatable contact 45 riding on the axle 46 is connected through switch 4 to ground 5.

Likewise, a third contacting wheel or disk 50 rides on the highly-conductive layer 103, which is formed on the lower surface of the ferroelectric medium 101. The wheel 50 is mounted on the axle 51, which rides in an insulating bushing 52, in a bearing of supporting frame 43*a*. Rotatable contact 53 mounted on axle 51 makes electrical connection to the armature of switch 8, which is alternatively connectable in position 8*a* to ground 10, or in position 8*b* to an output circuit including resistor 12. As in the previously described circuits, the output across resistor 12 is amplified in a conventional series-connected amplifier 13, and presented across the terminals 14 and 15, the latter being grounded. As previously described, a calibrated current measuring circuit 20, or other output device, is connected across terminals 14 and 15.

It is assumed that the element of tape 104 indicated in Figs. 8A, 8B, which includes layers 101, 102, and 103, described hereinbefore, mounted on a flexible backing tape 105, is driven by any means well known in the art to move with respect to the contacting wheels 40, 48, and 50. For example, it may form part of a closed loop, such as indicated in Fig. 10, the edge of the backing tape 105 having regular perforations (55 of Figs. 8A and 9), designed to engage a sprocket-wheel 57, which is driven to rotate by a conventional driving means 58, in a manner well known in the art. Alternatively, tape 104 need not be a continuous belt, but can be wound from one reel to another as is often customary, for example, in recording-reproducing systems employing magnetic tape.

In the manner taught with reference to the circuit of Fig. 2, the tape is first erased or conditioned by simultaneously placing switch 4 in a disconnect position with respect to ground 5, connecting constant voltage source 9 through position 6*b* of switch 6, and connecting switch 8 in position 8*a* to ground 10.

If it is desired to record, switch 6 is connected in position 6*a*, switch 4 in position 4*a*, and switch 8 in position 8*a*. In this condition, signal recording will take place along each of the strips 102, between the contacting members 40 and 48 as the tape is rotated over a closed path.

Also, in a manner similar to that described with reference to Fig. 2, the recorded signal is continuously recovered from the moving tape, assuming that switch 4 is set to disconnect the ground 5*a*, switch 6 is set on position 6*b* connecting negative potential source 9, and switch 8 is placed on contact 8*b* to the output circuit. Because of the discontinuous character of the high-resistant electrode layer 102, the output consists of a series of equally spaced pulses. However, the envelope of these pulses will be found to approximate the waveform of the stored signal.

It will be apparent that a number of alternative methods are available for reading out the signal from a continuous tape in which the signal is stored in accordance with the present invention. These include, for example, a method employing a pyroelectric stimulus in the manner indicated, for example, in Fig. 9 of the drawings. This operates substantially in the manner discussed with reference to Fig. 5.

Referring to the perspective showing in Fig. 9, which contemplates the use of a continuous tape recording medium of the type discussed with reference to Figs. 8A and 8B, and irradiating beam from a source 21, is focused on successive high-resistance strips 102 by means of cylindrical lens 22, so that the beam extends in substantial alignment with each strip, in succession.

As the tape progressively moves, wheel 48 rotates, connecting successive high-resistance strips 102 to ground 5 through an electromechanical arrangement such as described with reference to Fig. 8A. For the purpose of recovering the signal it will be apparent that the rotating contact 40 indicated in Fig. 8A can be dispensed with. However, the rotating disk 50 is still retained, making electrical contact with the output circuit through contact 8*b* of switch 8, and rotatable contact 53 riding on the axle 51 as previously indicated.

Other, equivalent methods for reading out the stored signal from a moving ferroelectric tape of the type disclosed will readily occur to those skilled in the art. For example, an available method is that disclosed and illustrated in Fig. 6 of application Serial No. 479,208 of W. P. Mason and R. N. Thurston, in which a carrier voltage is impressed across the varying capacity of a moving ferroelectric tape on which a signal has been recorded, the output being subsequently demodulated to recover the signal. For optimum operation of such a system for the recovery of signals stored in accordance with the present invention, the frequency of the carrier should probably not greatly exceed the audio range.

It will be apparent to those skilled in the art that the invention defined by the appended claims can assume numerous forms other than those described in this specification by way of illustrative example.

What is claimed is:

1. A device comprising in combination a ferroelectric memory element initially polarized uniformly in the direction of the thickness of said element, a high-resistance electrode film in contact with one of the surfaces of said element and extended uniformly in a direction transverse to the thickness direction of said element, means for connecting a source of signal potential across a substantial portion of said high-resistance film in said transverse direction, said potential being polarized to change the polarization of a portion of said element to a direction opposite the direction of the initial polarization of said element to an extent which is a function of said signal potential, a conducting electrode in contact with the surface of said element opposing said one surface thereof, and sensing means connected between said conducting electrode and said high-resistance film for determining the extent of the opposite polarization of said portion of said element.

2. A device comprising a relatively thin ferroelectric memory element having an initial uniform polarization in the direction of the thickness of said element, electrode means on the major surfaces of said element including a first electrode of substantially uniformly high resistivity extended across one of said surfaces, and a low-resistance second electrode correspondingly extended on the opposite surface of said element, means for storing electrical signals in said element comprising means for maintaining one point on said first electrode at a substantially fixed potential relative to said second electrode, a source of signal potential connected at a second point on said high-resistivity electrode at a substantial distance from said one point, said signal potential polarized in a direction to produce a field in said element directed to reverse the direction of said initial polarization in a portion of said element an extent corresponding to the amplitude of said signal potential thereby storing signals in said element, and means for simultaneously maintaining said low-resistance electrode at a fixed potential with respect to said signal potential, and means for recovering signals stored in said portion of said element comprising an output in series with a source of sensing pulses connectable across said element while said signal source is disconnected from said second point, said sensing source having a polarity to oppose the polarity of the signals stored in said portion of said element.

3. A device comprising in combination a relatively thin ferroelectric memory element having an initially uniform polarization in the direction of thickness between two opposing surfaces of said element, and electrode means coupled to said element including an electrode of substantially uniform high resistivity connected across one of said opposing surfaces, means for storing signals in said element comprising means for maintaining one point on said high-resistivity electrode at a substantially fixed potential, and a source of signal potential connected at another point on said high-resistivity electrode at a substantial space interval from said one point, said signal potential polarized to produce a field in said element directed to reverse the direction of said initial polarization in a portion of said element to an extent which is a function of said signal potential whereby signals are stored in said element, and means for recovering the signals stored in said element comprising a body of semiconductive material, said element disposed with the other of said opposing surfaces thereof in contact with a major surface of said semiconductive body, further electrode means connected to oppositely disposed surfaces of said semiconductive body, and energizing means and an output circuit connected to said semiconductive body through said last-named electrode means whereby the current flow in said semiconductive body is varied as a function of the extent of the reversed polarization portion of said element, said energizing means and output circuit including means for maintaining said further electrode means and thereby the oppositely disposed surfaces of said semiconductive body at a substantially fixed potential, said output circuit also including means for detecting variations in the current in the said semiconductive body as a measure of the extent of the reversed polarization in said portion of said element and thereby as a function of the signals stored therein.

4. A device comprising in combination a relatively thin ferroelectric memory element having an initial uniform polarization in the direction of the thickness between two major surfaces of said element, electrode means coupled to said element including an electrode of substantially uniform high resistivity connected across one of said major surfaces, means for storing signals in said element comprising means for maintaining one point on said high-resistivity electrode at a substantially fixed potential, and a source of signal potential for connection to another point on said high-resistivity electrode at a substantial space interval from said one point, said signal potential polarized to produce a field in said element directed to reverse the direction of said initial polarization in a portion of said element an extent which is a function of said signal potential thereby storing signals in said element, means for recovering signals stored in said element comprising a body comprising $n$ and $p$ conductivity types of semiconductive material with a junction layer therebetween, said element disposed with another of the major surfaces thereof in contact with a major surface of said semiconductive body, said element also disposed with respect to said junction layer whereby at least a portion of said element is adjacent each of said conductivity types of said semiconductive body, electrodes respectively connected to said $n$ and $p$ conductivity types of said semiconductive body, a potential means and an output circuit connected in circuit relation with said last-named electrodes whereby the current flow in said semiconductive body is varied as a function of the extent of the reversed polarization portion in said element, said potential means and output circuit including means for maintaining said last mentioned electrodes and thereby said last mentioned conductivity types at a fixed potential, and means included in said output circuit for detecting variations in the current in said semiconductive body as a measure of the extent of the reversed polarization in said portion of said element and thereby as a function of the signals stored therein.

5. An analog memory device comprising in combination a ferroelectric single crystal element, said element having a first electrode in the form of a substantially uniform highly-resistant strip disposed along one surface thereof, a highly conducting second electrode affixed in a corresponding position to the opposing surface of said element, means connectable to said electrodes for impressing on said element a substantially uniform polarization in the thickness direction thereof, means for maintaining between said highly conductive electrode and a first point on said highly-resistant electrode a substantially fixed potential, a source signal potential connectable simultaneously with said last-named means at a second point substantially spaced from said first point on said highly-resistant electrode, said signal potential polarized to produce a field in said element directed to reverse the direction of said initial polarization in a portion of said element to an extent dependent on the amplitude of said signal potential thereby storing a signal in said element, and means connectable to said second electrode to measure the extent of the reversed polarity in said last-mentioned portion for recovering the signal stored in said element.

6. An analog memory device comprising in combination a ferroelectric single crystal element, said element having a first electrode in the form of a substantially uniform highly-resistant strip disposed across one surface thereof, a highly conducting second electrode affixed in a corresponding position on the opposing surface of said element, means connectable to said electrodes for initially impressing on said element a substantially uniform polarization in the thickness direction thereof, means for storing electrical signals in said element comprising a fixed potential connectable at one point on said highly-resistant electrode, a source of signal potential connectable at another point on said highly-resistant electrode substantially spaced from said one point, said signal potential polarized to produce a field in said element directed to reverse the direction of said initial polarization in a portion of said element to an extent which is a function of said signal potential whereby signals are stored in said element, means included in said uniform polarizing means for simultaneously maintaining said highly conducting electrode at a fixed potential with respect to said signal potential, and means for recovering signals stored in said element comprising a source of a beam of radiant energy focused on said element, and an output circuit connectable between said first and second electrodes for detecting the pyroelectric current generated in said portion of reversed polarization in said element and in the remainder of the initial polarization of said element by said beam as a function of the signals stored in said element.

7. An electrical recording system which comprises in combination a thin tape comprising ferroelectric crystalline material having a substantially uniform initial polarization in a thickness direction in said tape, electrode means comprising a succession of uniformly spaced, substantially parallel, highly-resistant strips extended across the width of one of the surfaces of said tape, and a highly conductive backing electrode contacting corresponding areas on the opposing surface of said tape, a pair of contacts, one of which is maintained at a substantially fixed potential, respectively disposed to make contact simultaneously with each of said highly-resistant strips in succession at positions spaced apart a fixed interval on said strips, and a third contact disposed to simultaneously contact said highly conductive backing means, means for progressively moving said tape with respect to said contacts, a signal source connectable across said pair of contacts for impressing signal potential along each of said highly-resistant parallel strips in succession, which potential produces a field in the ferroelectric medium directed to oppose the initial polarization of said tape, and means for maintaining said third contact at a fixed potential with respect to said signal potential, whereby as said tape is progressively moved past said contacts, the polarization of the portion thereof between said contacts is reversed as a function of said signal voltage.

8. An electrical recording and reproducing system which comprises in combination a thin tape comprising ferroelectric crystalline material having a substantially uniform initial polarization in a thickness direction in said tape, electrode means comprising a succession of uniformly spaced, substantially parallel, highly-resistant strips extended across the width of one of the surfaces of said tape, and a highly conductive backing electrode contacting corresponding areas on the opposing surface of said tape, a pair of contacts respectively disposed to make contact simultaneously with the ends of each of said highly-resistant strips in succession and a third contact disposed continuously on said highly conductive backing means, means for progressively moving said tape with respect to said contacts; for signal storage: one of the contacts of said pair maintained at a substantially fixed potential relative to the third contact, a signal source connectable to the other contact of said pair for impressing signal potential along each of said highly-resistant parallel strips in succession, which potential produces a field in the ferroelectric medium directed to oppose the initial polarization of said tape, and means for maintaining said third contact at a fixed potential with respect to said signal potential, whereby as said tape is progressively moved past said pair of contacts the polarization of the portion thereof between said contacts is reversed, the extent of said portion being a function of said signal voltage; and for signal recovery: an output meter connectable between the backing electrode and each of said strips in succession.

9. An electrical recording and reproducing system which comprises in combination a thin tape comprising ferroelectric crystalline material having a substantially uniform initial polarization in a thickness direction in said tape, electrode means comprising a succession of uniformly spaced, substantially parallel, highly-resistant strips extended across the width of one of the surfaces of said tape, and a highly conductive backing electrode contacting corresponding areas on the opposing surface of said tape, a pair of contacts respectively disposed to make contact simultaneously with each of said highly-resistant strips in succession at positions spaced apart a substantially fixed interval thereon, and a third contact disposed continuously on said highly conductive backing means, means for progressively moving said tape with respect to said contacts; for signal storage: one of the contacts of said pair maintained at a substantially fixed potential, a signal source connectable to the other contact of said pair for impressing signal potential along each of said highly-resistant parallel strips in succession, which potential produces a field in the ferroelectric medium directed to oppose the initial polarization of said tape, and means for maintaining said third contact at a fixed potential with respect to said signal potential, whereby as said tape is progressively moved past said contacts, the polarization of the portion thereof between said contacts is reversed to an extent which is a function of said signal voltage; and for signal recovery: an output meter in series with a source of direct-current sensing potential connectable across said electrode means in a direction to oppose the polarity of the signal voltage stored in said tape.

10. An electrical recording system which comprises in combination a thin tape comprising ferroelectric crystalline material having an initial uniform polarization in the direction of the thickness of said tape, electrode means of uniformly high resistivity extended across the width of said tape, and highly conductive backing means contacting corresponding areas on the opposing surface of said tape, a pair of contacts respectively disposed at positions spaced apart a substantially fixed interval on said high-resistivity electrode means in the width direction of said tape, and a third contact disposed on said highly conductive backing means, means for progressively moving said tape with respect to said contacts, a signal source connectable across said pair of contacts for impressing signal potential across said high-resistivity electrode means in the width direction of said tape, said signal potential polarized to produce a field in the ferroelectric medium directed to oppose the initial polarization of said tape, and means for maintaining said third contact at a fixed potential with respect to said signal potential, whereby as said tape is progressively moved past said contacts the polarization of the portion thereof between said contacts is reversed as a function of said signal voltage.

11. An electrical recording and reproducing system which comprises in combination a thin tape comprising ferroelectric crystalline material having an initial uniform polarization in the direction of the thickness of said tape, electrode means of uniform high-resistivity extended across the width of one surface of said tape, and a highly conductive backing means contacting corresponding areas on the opposing surface of said tape, a pair of contacts respectively disposed at positions spaced apart a substantially fixed interval in the width direction of said tape on said high-resistivity electrode means, and a third contact disposed on said highly conductive backing means, means for progressively moving said tape with respect to said contacts; for signal storage: a signal source connectable across said pair of contacts on said high-resistivity electrode means for impressing signal potential across said high-resistivity electrode in the width direction of said tape, said signal potential polarized to produce a field in the ferroelectric medium directed to oppose the initial polarization of said tape, means adapted to maintain said third contact at a fixed potential with respect to said signal potential, whereby as said tape is progressively moved past said contacts, the polarization of the portion thereof between said contacts is reversed as a function of said signal voltage; and for signal recovery: a source of a beam of radiant energy focused on said element, an output circuit connectable though said contacts between said electrode means and said backing means for detecting the pyroelectric current generated in said element by said beam.

12. A device comprising in combination a ferroelectric memory element having an initial uniform polarization in the direction of the thickness of said element, said element having a first electrode of substantially uniformly high resistivity extended across one of the major surfaces thereof, and an electrically conducting second electrode extending across the opposed major surface, means for storing electrical signals in said element comprising means for maintaining one point on said first electrode at a substantially fixed potential relative to said second electrode, a signal source connected at another point on said first electrode spaced a substantial interval from said first point to impress a potential gradient in a substantial portion of said first electrode between said points providing a field in said element to a varying degree to reverse said initial polarization of said element in said thickness direction, whereby the direction of polarization in a portion of said element is reversed to an extent dependent on the magnitude of said signal potential, and means for recovering the signal stored in said portion of said element comprising an output connected between said first and second electrodes.

13. Apparatus comprising a ferroelectric memory element having an initial uniform polarization in the direction of the thickness of said element, a first electrode comprising a sheet of substantially uniform high resistivity extended across one of the major surfaces of said element, and a low-resistance second electrode correspondingly extended on the opposite surface of said element, means for storing electrical signals in said element comprising means for maintaining a first point on said first electrode at a substantially fixed potential relative to said second electrode, a source of signal potential for connection to a second point on said first electrode at a substantial distance from said first point, said signal potential being polarized to reverse the direction of said initial polarization in a portion of said element to an extent corresponding to the magnitude of said signal potential thereby storing signals in said element, and means for simultaneously maintaining said second electrode at a fixed potential with respect to said signal potential, and means for recovering signals stored in said element comprising a source of a beam of radiant energy focused on said element, and means connected between said first and second electrodes while said fixed potential and signal source are removed therefrom for detecting the pyroelectric current generated in said portion and the remainder of the initial polarization in said element by said beam as a function of the signal stored in each element.

14. A memory device comprising in combination a ferroelectric crystalline element having an initial polarization in the direction of the thickness of said element, a high-resistance electrode extended across one of the major surfaces of said element in a direction transverse to the thickness direction thereof, a conducting electrode extended across the opposing major surface of said element, means for maintaining a first point located adjacent to one end of said high-resistance electrode and said conducting electrode at a fixed potential, and a source of signal potential connected to a second point spaced from said first point on said high-resistance electrode and lying adjacent to the opposite end of said last-mentioned electrode, said signal potential being of such polarity as to reverse the polarization in a portion of said element from the initial direction to a direction opposite thereto, the extent of the reversed polarization in said portion being a function of the signal potential.

15. An analog memory device comprising in combination a ferroelectric element, a highly-resistant electrode mounted on one surface of said element, a semiconductor device having an n-type material and a p-type material disposed in abutting relation to form therebetween a junction layer which is normal to opposing major surfaces of said device, said device having one major surface disposed in contact with said element on a surface opposite to said one surface thereof so that said element overlaps both said n-type and p-type materials, electrodes attached to other opposite surfaces of said device, first means operable to connect a fixed potential to said highly-resistant electrode, second means operable to connect a fixed potential to said other electrodes, means connectable to said highly-resistant electrode and including said second fixed potential means for establishing a substantially uniform polarization between said one and opposite surfaces of said element, means connectable to said highly-resistant electrode in place of said establishing means and including said first and second fixed potential means to apply a signal potential to said highly-resistant electrode for reversing the direction of polarization in a portion of said element to an extent depending on the magnitude of said signal potential thereby storing a signal in said last-mentioned element, said reversed polarization portion of said element effectively increasing the length of said junction layer by extending a section in a direction parallel with said one major surface of said device as a function of said signal potential, and means for recovering the signal stored in said element while said first and second means are operable to remove the fixed potential from said highly-resistant electrode and said other electrodes respectively, comprising a source of direct current having positive and negative terminals of which said positive terminal is connected through a first of said other electrodes to said n-type material thereby biasing said increased length of said junction layer in the reverse direction, and means connectable to said last mentioned negative terminal and through the second of said other electrodes to said p-type material for detecting variations in the current through said device due to said increased junction layer thereof as a function of the signal stored in said element.

References Cited in the file of this patent

UNITED STATES PATENTS

| | | |
|---|---|---|
| 2,791,758 | Looney | May 7, 1957 |
| 2,791,759 | Brown | May 7, 1957 |
| 2,791,761 | Morton | May 7, 1957 |

FOREIGN PATENTS

| | | |
|---|---|---|
| 8,634 | Germany | Mar. 29, 1956 |